(12) United States Patent  
Thakare et al.

(10) Patent No.: US 8,819,477 B1  
(45) Date of Patent: Aug. 26, 2014

(54) ERROR HANDLING IN A NETWORK PAGE GENERATION ENVIRONMENT

(75) Inventors: Prashant J. Thakare, Mercer Island, WA (US); Andrew S. Huntwork, Seattle, WA (US); Jeremy Boynes, Mercer Island, WA (US); Pravi Garg, Seattle, WA (US); Shashank Shekhar, Karnataka (IN)

(73) Assignee: Amazon Technologies, Inc., Reno, NV (US)

( * ) Notice: Subject to any disclaimer, the term of this patent is extended or adjusted under 35 U.S.C. 154(b) by 262 days.

(21) Appl. No.: 13/363,782

(22) Filed: Feb. 1, 2012

(51) Int. Cl.
*G06F 11/00* (2006.01)

(52) U.S. Cl.
USPC .............................. 714/4.1; 714/4.2

(58) Field of Classification Search
CPC ............................ G06F 11/0712; G06F 11/301
USPC .......................... 714/4.1, 4.2, 4.12
See application file for complete search history.

(56) References Cited

U.S. PATENT DOCUMENTS

| | | | |
|---|---|---|---|
| 7,113,301 B2* | 9/2006 | Su | 358/1.15 |
| 7,340,714 B2* | 3/2008 | Upton | 717/102 |
| 7,620,653 B1* | 11/2009 | Swartz | 1/1 |
| 8,468,360 B2* | 6/2013 | Morita et al. | 713/180 |
| 2004/0181609 A1* | 9/2004 | Ullmann et al. | 709/245 |
| 2007/0192215 A1* | 8/2007 | Taylor et al. | 705/28 |

OTHER PUBLICATIONS

U.S. Appl. No. 13/363,761 entitled "Multipart Encoding in Data Aggregation for Network Page Generation,", filed Feb. 1, 2012.
U.S. Appl. No. 13/363,770 entitled "Loading Customer-Supplied Network Page Generation Code,", filed Feb. 1, 2012.
U.S. Appl. No. 13/348,069 entitled "Securing Execution of Customer-Supplied Network Page Generation Code,", filed Jan. 11, 2012.
U.S. Appl. No. 13/363,787 entitled "Data Contracts for Network Page Generation Code,", filed Feb. 1, 2012.
U.S. Appl. No. 13/363,816 entitled "Network Site Hosting in a Managed Environment,", filed Feb. 1, 2012.
U.S. Appl. No. 13/348,051 entitled "Generating Network Page Using Customer-Supplied Generation Code,", filed Jan. 11, 2012.
U.S. Appl. No. 13/348,088 entitled "Facilitating Access to Data in Network Page Generation Code,", filed Jan. 11, 2012.
U.S. Appl. No. 13/348,081 entitled "Virtual File System for Hosted Network Sites,", filed Jan. 11, 2012.
U.S. Appl. No. 13/348,059 entitled "Generating Network Page Using Customer-Generated Network Page Portions,", filed Jan. 11, 2012.
U.S. Appl. No. 13/347,953 entitled "Opportunistic Unloading of Network Applications,", filed Jan. 11, 2012.

* cited by examiner

*Primary Examiner* — Dieu-Minh Le
(74) *Attorney, Agent, or Firm* — Thomas Horstemeyer, LLP

(57) ABSTRACT

Disclosed are various embodiments that facilitate error handling in a network page generation environment. A request for a network page is obtained from a client. The network page is associated with a network site hosted by a hosting provider on behalf of a customer. Page generation code supplied by the customer is executed by a framework in response to the request. The page generation code is configured to generate at least a portion of the network page. A customized error network page is sent to the client in response to determining that an error has occurred in the framework that executes the page generation code.

24 Claims, 4 Drawing Sheets

ERROR HANDLING IN A NETWORK PAGE GENERATION ENVIRONMENT

BACKGROUND

Compliance with Payment Card Industry Data Security Standards (PCI DSS) and/or other security standards may present challenges for online merchants. For this and other reasons, online merchants may elect to have their electronic commerce platform managed by a third-party electronic commerce hosting provider who ensures compliance with the security standards. However, merchants may lose flexibility in customizing or configuring their network sites when using such a hosted solution as compared with a self-managed solution.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing error handling in a network page generation environment having a hosted framework. A hosting provider may offer network site hosting for a plurality of customers. Such hosting may include access to an electronic commerce platform or other hosted application. For security and other various reasons, customer-supplied network page generation code may be executed under a framework that restricts the operations permitted in the code. Also, the page generation code may be restricted from directly accessing data sources of the electronic commerce platform. To provide access, data from the electronic commerce platform that is used by the page generation code may be aggregated from one or more data sources in advance for use by the page generation code.

Various techniques relating to a data aggregation framework are provided in U.S. patent application Ser. No. 13/348,051 entitled "GENERATING NETWORK PAGES USING CUSTOMER-SUPPLIED GENERATION CODE" and filed on Jan. 11, 2012, and in U.S. patent application Ser. No. 13/348,059 entitled "GENERATING NETWORK PAGES USING CUSTOMER-GENERATED NETWORK PAGE PORTIONS" and filed on Jan. 11, 2012, both of which are incorporated herein by reference in their entirety.

Errors may occur in the data aggregation or elsewhere in the network page generation environment for a variety of reasons. Such errors may be internal server errors and/or other types of errors. For security and/or other reasons, the customer-supplied page generation code may be restricted from including exception-handling code. Nonetheless, it is desirable to allow customers to customize error messages for their particular network sites to provide a consistent user experience and for other reasons.

Various embodiments of the present disclosure facilitate error handling of framework-generated errors and/or other errors. Customers of a hosting provider may provide and/or configure error page generation code to generate customized error pages. Further, for non-fatal errors (e.g., if a certain data item could not be obtained during data aggregation, etc.), error indications may be provided to the customer-supplied page generation code to facilitate error handling. In the following discussion, a general description of the system and its components is provided, followed by a discussion of the operation of the same.

Figure 1:
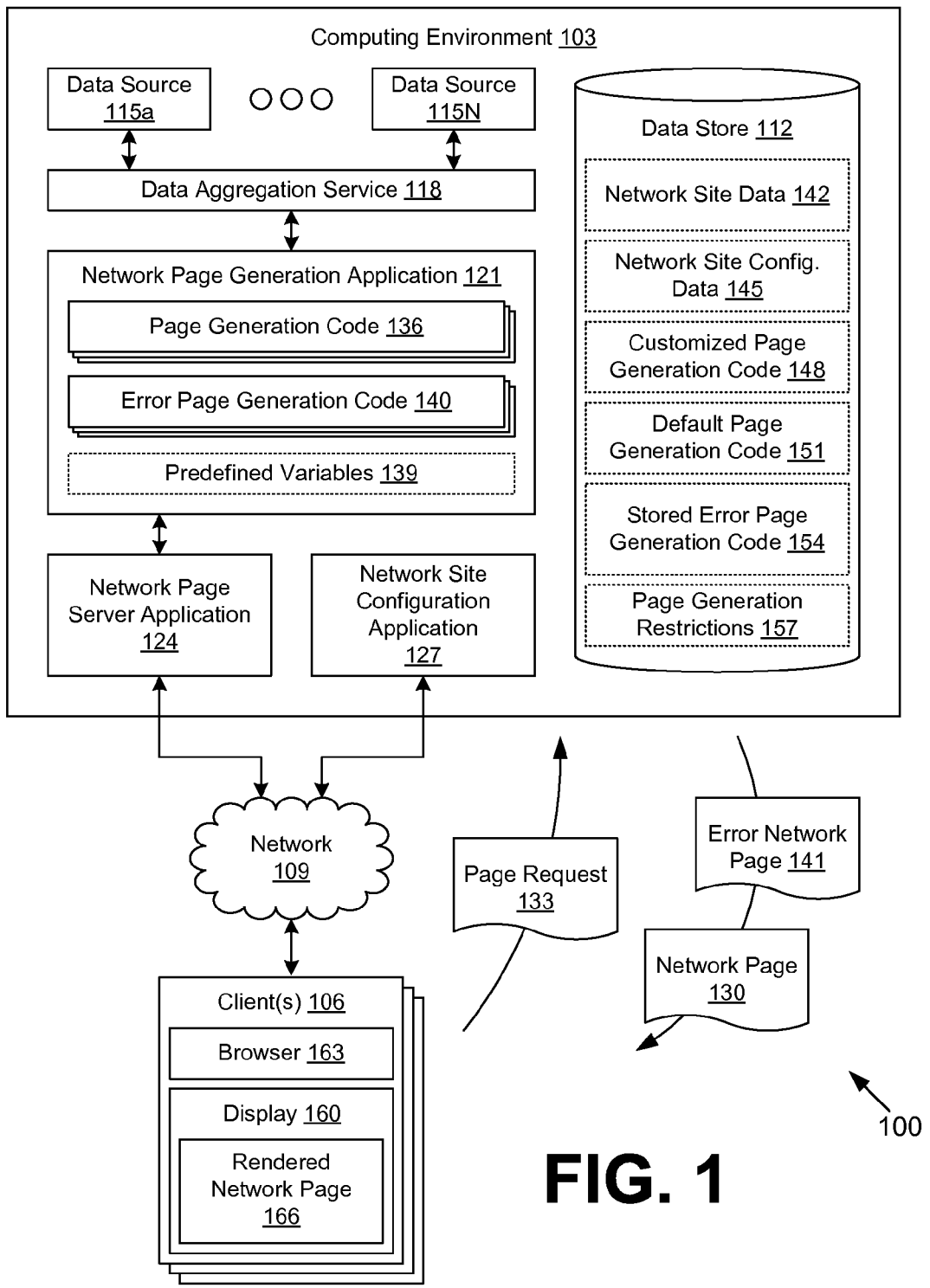
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations. The computing environment 103 may be operated by a hosting provider to host network sites for various customers.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed by the computing environment 103, for example, include a plurality of data sources 115a . . . 115N, a data aggregation service 118, a network page generation application 121, a network page server application 124, a network site configuration application 127, and other applications, services, processes, systems, engines, or functionality not discussed in detail herein. The data sources 115 are executed to provide various data used in generating network pages 130 for network sites of customers of the hosting provider. Where the customers are merchants, the data provided by the data sources 115 may relate to electronic commerce data such as, for example, item catalog data, item suggestions data, shopping cart data, checkout data, order data, and so on. In one embodiment, the data sources 115 may comprise web services. In another embodiment, the data sources 115 may comprise files or other forms of data stores.

The data aggregation service 118 is executed to aggregate data from the data sources 115 for use in generation of network pages 130. The data aggregation service 118 may employ parallel fetching to reduce latency when data is aggregated from multiple data sources 115. The network page generation application 121 is executed to generate the network pages 130 in response to page requests 133 obtained from clients 106. The network pages 130 may correspond to web pages, gopher pages, mobile application screens, and/or other forms of network content. Where the customer is a merchant, the network pages 130 may correspond to home pages, catalog pages, item detail pages, shopping cart pages, checkout pages, order confirmation pages, and so on. Such network pages 130 may facilitate selecting items for purchase, rental, download, lease, or other form of consumption. In addition, where the customer is a merchant, the network page generation application 121 may include, or be in communication with, an electronic commerce system that performs various backend functions in order to facilitate the online purchase of items.

The network page generation application 121 may execute page generation code 136 in order to generate the network pages 130. The page generation code 136 may correspond to a default version supplied by the hosting provider or may correspond to a customized version supplied by the customer. In some cases, the page generation code 136 may be transformed or compiled from one code format to another and/or may be interpreted. As a non-limiting example, the page generation code 136 may correspond to JavaServer Pages (JSPs), which may be compiled into Java® servlets, which in turn may be compiled into bytecode which may be executable by the network page generation application 121. To this end, the network page generation application 121 may include a servlet container such as Apache® Tomcat® or another servlet container.

The network page generation application 121 may be configured to obtain aggregated data from the data aggregation service 118 and to provide the aggregated data to the page generation code 136, for example, as a set of predefined variables 139 or by another approach. The network page generation application 121 may act as a "sandbox" for the page generation code 136 to enforce restrictions on application programming interface (API) calls, access to the data source 115, and/or other resources in the computing environment 103.

The network page generation application 121 may execute error page generation code 140 in response to detecting framework-originated errors to generate error network pages 141. The error page generation code 140 may correspond to a default version supplied by the hosting provider or may correspond to a customized version supplied by the customer. The error network pages 141 may be generated in place of the requested network page 130 when some unrecoverable error occurs. Such an error may originate, for example, in the data aggregation phase or in the network page generation phase. For example, the errors may correspond to hypertext transfer protocol (HTTP) errors, such as an internal server error (error code 500), a service unavailable error (error code 503), a forbidden error (error code 403), a file not found error (error code 404), and/or other HTTP errors. In some cases, the error page generation code 140 may be transformed or compiled from one code format to another and/or may be interpreted. As a non-limiting example, the error page generation code 140 may correspond to JSPs, which may be compiled into Java® servlets, which in turn may be compiled into bytecode which may be executable by the network page generation application 121.

The network page server application 124 is configured to obtain the page requests 133 from the client 106 over the network 109, to generate network pages 130 (or error network pages 141, if an error occurs) in response to the page requests 133 using the network page generation application 121, and to return the network pages 130 to the client 106 by way of the network 109. The network page server application 124 may correspond to a commercially available HTTP server such as, for example, Apache® HTTP Server, Apache® Tomcat®, Microsoft® Internet Information Services (IIS), and/or other servers.

The network site configuration application 127 is executed to facilitate customer configuration of network sites. To this end, the network site configuration application 127 may enable uploading and configuration of the page generation code 136, configuration of various parameters associated with the operation of the network site, order fulfillment management, item catalog management, and/or other functionality. The network site configuration application 127 may implement an HTTP server, a web-based distributed authoring and versioning (WebDAV) server, a file transfer protocol (FTP) server, and/or other servers.

The data stored in the data store 112 includes, for example, network site data 142, network site configuration data 145, customized page generation code 148, default page generation code 151, stored error page generation code 154, page generation restrictions 157, and potentially other data. The network site data 142 corresponds to data used in the generation of the network pages 130 for the hosted network sites of the merchants or other customers. Such data may include, for example, templates, hypertext markup language (HTML), text, extensible markup language (XML), cascading style sheets (CSS), images, audio, video, animations, and/or other data.

The network site configuration data 145 may store parameters and/or other data for controlling the operation and appearance of the hosted network site. Such data may control various electronic commerce functionality such as, for example, item catalogs, item taxonomies, item searching, item recommendations, shopping carts, checkout, order fulfillment, and/or other functionality. The customized page generation code 148 corresponds to page generation code 136 which is created or customized by merchants or other customers. The default page generation code 151 may correspond to a default set of page generation code 136 for a merchant or other customer to use for a base functionality for a network site. The default page generation code 151 may generate network pages 130 having, for example, a default appearance and behavior for a generic electronic commerce site.

The stored error page generation code 154 corresponds to the error page generation code 140 that may be configured and customized by the customer for use in handling errors on a hosted network site. In some cases, the stored error page generation code 154 may correspond to default code supplied by the hosting provider. The page generation restrictions 157 may configure various restrictions to be placed on the page generation code 136 by the network page generation application 121. As a non-limiting example, where the page generation code 136 corresponds to JSP code, the network page generation application 121 may restrict the JSP code from including scriptlets and/or various API calls. Various functionalities may be whitelisted or blacklisted, as the case may be. Such restrictions may be configured by way of parameters in the page generation restrictions 157.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 130 served up by the computing environment 103 and/or other servers, thereby generating a rendered network page 166 on the display 160. The client 106 may be configured to execute applications beyond the browser 163 such as, for example, code development applications, file transfer applications, mobile applications, email applications, instant message applications, and/or other applications.

Next, a general description of the operation of the various components of the networked environment 100 is provided. To begin, a merchant or other customer of a hosting provider associated with the computing environment 103 configures a network site to be hosted through the computing environment 103. The network site may have a common domain that is shared by multiple customers of the hosting provider, or the network site may correspond to a unique domain for each customer. The merchant or other customer may adopt default page generation code 151 for various network pages 130 accessible through the network site. Alternatively, or additionally, the merchant or other customer may create customized page generation code 148 for generating some or all of the network pages 130 accessible through the network site.

The merchant or other customer may interact with the network site configuration application 127 to customize or make changes to the network site. In various cases, the customer may edit the page generation code 136 directly through the network site configuration application 127, or the customer may upload replacement page generation code 136. Through this system, customers are able to control generation of network pages 130 for their network sites, despite using a hosted infrastructure and potentially a hosted electronic commerce platform.

Additionally, the merchant or other customer may create or customize the stored error page generation code 154 for use in handling errors originating in the data aggregation and code execution framework and/or other code outside of the control of the customer. The customer may establish mappings of various error codes (e.g., HTTP error codes or other error codes) to particular files or sets of the stored error page generation code 154. Such configuration parameters may be stored in the network site configuration data 145. As a non-limiting example, the customer may configure a specific JSP file in the stored error page generation code 154 for handling internal server errors having HTTP error code 500. The JSP file may include a customized layout with graphics and formatting that maintain the same or similar look-and-feel from the network site of the customer. The JSP file may include a customized error message which may be more helpful and provide an enhanced user experience over that of a generic internal server error message.

The page generation code 136 is able to access the aggregated data generated by the data aggregation service 118 by way of predefined variables 139. In some cases, the page generation code 136 may declare various data that it accesses, which is then aggregated by the data aggregation service 118. In other cases, the data aggregation service 118 may provide a standard set of data from the data sources 115. The set of data may depend on the type of network page 130, e.g., whether the network page 130 is a checkout page, catalog page, order confirmation page, and so on. In one example, the aggregated data may be associated with the hosted electronic commerce platform provided by the hosting provider. The predefined variables 139 may be provided to the page generation code 136 by way of implicit variables or other variables that are available in the scope of the page generation code 136. The page generation code 136 may be configured to use all of the predefined variables 139 or a subset of the predefined variables 139. The page generation code 136 may be restricted from accessing the data sources 115 directly.

Some errors may occur in the data aggregation phase and/or otherwise may be non-fatal to the execution of the page generation code 136. Upon such recoverable errors, the network page generation application 121 may be configured to set an error indication in a predefined variable 139. As a non-limiting example, page generation code 136 supplied by a customer may expect to access a certain predefined variable 139 containing a shopping cart representation: "$cart." Suppose there is an error in obtaining the shopping cart by the data aggregation service 118. Consequently, "$cart" may be set to a null value, and another predefined variable 139 of "$error.cart" may be set to an error identifier that indicates that a shopping cart has not yet been created. When generating the network page 130, the page generation code 136 can verify whether the value of $cart is null. If the value is null, and if the value of "$error.cart" is set to an error identifier, the page generation code 136 may be able to recover from the error and generate a display region, for example, indicating that the shopping cart is considered to be empty because no items have been added to it.

In operation, the client 106 sends a page request 133 to the network page server application 124 for some network page 130 from a network site of a customer. The network site is hosted on behalf of the customer by the hosting provider who operates the computing environment 103. Where the customer is a merchant, the hosting provider may operate a hosted electronic commerce platform in conjunction with the computing environment 103. The page request 133 is provided to the network page generation application 121, which then obtains the aggregated data from the data aggregation service 118. The aggregation may be performed automatically in response to the page request 133 or in advance of the page request 133. The data aggregation service 118 fetches the aggregated data from one or more data sources 115. If a recoverable error occurs in this data aggregation, an error indication may be page generation code 136 by one or more predefined variables 139 (e.g., "$error," etc.).

The page generation code 136 for the requested network page 130 is executed by the network page generation application 121. The network page generation application 121 facilitates access to the predefined variables 139 by the page generation code 136. The page generation code 136 generates the network page 130, and the network page server application 124 serves up the network page 130 to the client 106 in response to the page request 133.

If any non-recoverable error occurs in the framework (e.g., the data aggregation service 118, a JVM, a servlet container, components of the network page generation application 121, and so on), the network page generation application 121 may abort the generation of the network page 130. Instead, if so configured, the network page generation application 121 may execute error page generation code 140 that has been supplied or customized by the customer for the network site of the customer in order to generate an error network page 141. Which error page generation code 140 is selected may depend at least in part on the type of error. As a non-limiting example, a customer may configure different error page generation code 140 (e.g., different JSP files, etc.) to be used for an HTTP 404 error versus an HTTP 500 error. The error network page 141 is sent to the client 106 in response to the page request 133 in place of the network page 130.

Such error handling may be used for any error in the framework that causes an interruption in processing for the page generation code 136. Such errors may be framework errors and non-customer-caused errors. Such errors may ordinarily result in a generic error message established by the hosting provider, which may be discordant with an otherwise consistent user experience of the network site of the customer. The use of the error page generation code 140 as described herein allows the customer to customize error messages, which may be caused by code outside of the control of the customer, to fit with a consistent user experience.

In some embodiments, the page generation code 136 is restricted from accessing one or more of the data sources 115. The customer-supplied page generation code 136 may be isolated from one or more of the data sources 115 for purposes of complying with PCI DSS and/or other security standards. Consequently, the data from the data sources 115 may be accessible only as aggregated data provided by the data aggregation service 118 as predefined variables 139. It is noted that the data aggregation service 118 may generate the aggregated data in response to the page request 133, in response to other events, or at other times as desired. In some scenarios, the data aggregation service 118 may be configured to provide aggregated data to the error page generation code 140 as predefined variables 139.

The page generation code 136 and/or the error page generation code 140 may be analyzed for compliance with one or more policies according to the page generation restrictions 157 when initially configured or compiled and/or at runtime. Such policies may include acceptable content of the network page 130, API usage, usage of scriptlets or other disallowed language features, and so on. The page generation restrictions 157 may specify that no exception-handling code is permitted in the page generation code 136 or the error page generation code 140. If the page generation code 136 and/or the error page generation code 140 are determined to be non-compliant, the page generation code 136 and/or the error page generation code 140 may be unexecuted, terminated if already executing, replaced with default page generation code 151, or another action may be taken.

Figure 2:
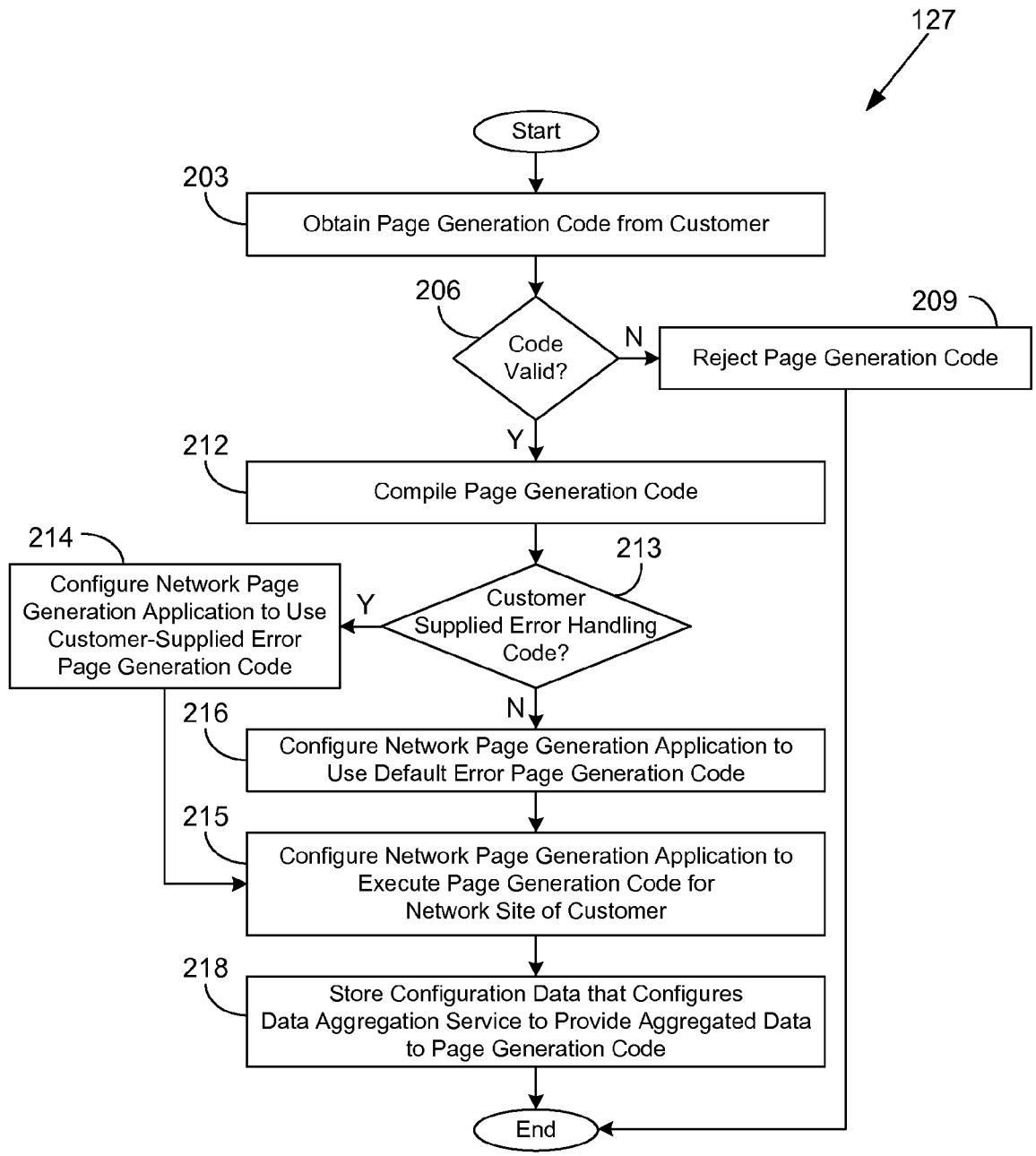
FIG. 2 is a flowchart illustrating one example of functionality implemented as portions of a network site configuration application executed in a computing environment in the networked environment of FIG. 1 according to various embodiments of the present disclosure.

Turning now to FIG. 2, shown is a flowchart that provides one example of the operation of a portion of the network site configuration application 127 according to the embodiments discussed in connection with FIG. 1. It is understood that the flowchart of FIG. 2 provides merely an example of the many different types of functional arrangements that may be employed to implement the operation of the portion of the network site configuration application 127 as described herein. As an alternative, the flowchart of FIG. 2 may be viewed as depicting an example of steps of a method implemented in the computing environment 103 (FIG. 1) according to one or more embodiments.

Beginning with box 203, the network site configuration application 127 obtains page generation code 136 (FIG. 1) from a customer whose network site is hosted by the hosting provider who operates the computing environment 103. The page generation code 136 may correspond to error page generation code 140 (FIG. 1) in some cases. The network site configuration application 127 may be configured to authenticate a client 106 (FIG. 1) associated with the customer. In box 206, the network site configuration application 127 determines whether the page generation code 136 is valid. If the page generation code 136 is not valid, the network site configuration application 127 rejects the page generation code 136 in box 209. An error may be presented to the customer. Thereafter, the portion of the network site configuration application 127 ends.

If the page generation code 136 is valid, the network site configuration application 127 proceeds from box 206 to box 212. Even assuming that the page generation code 136 is determined to be valid by the network site configuration application 127, validity checks may still need to be performed by the network page generation application 121 (FIG. 1) at runtime. In box 212, the network site configuration application 127 compiles the page generation code 136. For example, the network site configuration application 127 may compile the page generation code 136 from a JSP into a servlet. The resulting servlet code may also be compiled into bytecode for execution by a Java® Virtual Machine (JVM) or directly by a processor circuit of the computing environment 103.

In box 213, the network site configuration application 127 determines whether the customer has supplied error page generation code 140. If the customer has supplied error page generation code 140, the network site configuration application 127 moves from box 213 to box 214 and configures the network page generation application 121 to use the customer-supplied error page generation code 140 for handling one or more types of errors. The network site configuration application 127 may also compile the error page generation code 140. The network site configuration application 127 then moves to box 215.

If the network site configuration application 127 instead determines that the customer has not supplied error page generation code 140, the network site configuration application 127 proceeds from box 213 to box 216. In box 216, the network site configuration application 127 configures the network page generation application to use default error page generation code 140. The network site configuration application 127 then moves to box 215. In box 215, the network site configuration application 127 configures the network page generation application 121 to execute the compiled page generation code 136 for one or more network pages 130 (FIG. 1) for the network site of the customer. In box 218, the network site configuration application 127 may store configuration data that configures the data aggregation service 118 (FIG. 1) to provide a set of aggregated data to the page generation code 136 as predefined variables 139 (FIG. 1). In some cases, error page generation code 140 may also be configured to use aggregated data. Thereafter, the portion of the network site configuration application 127 ends.

Figure 3:
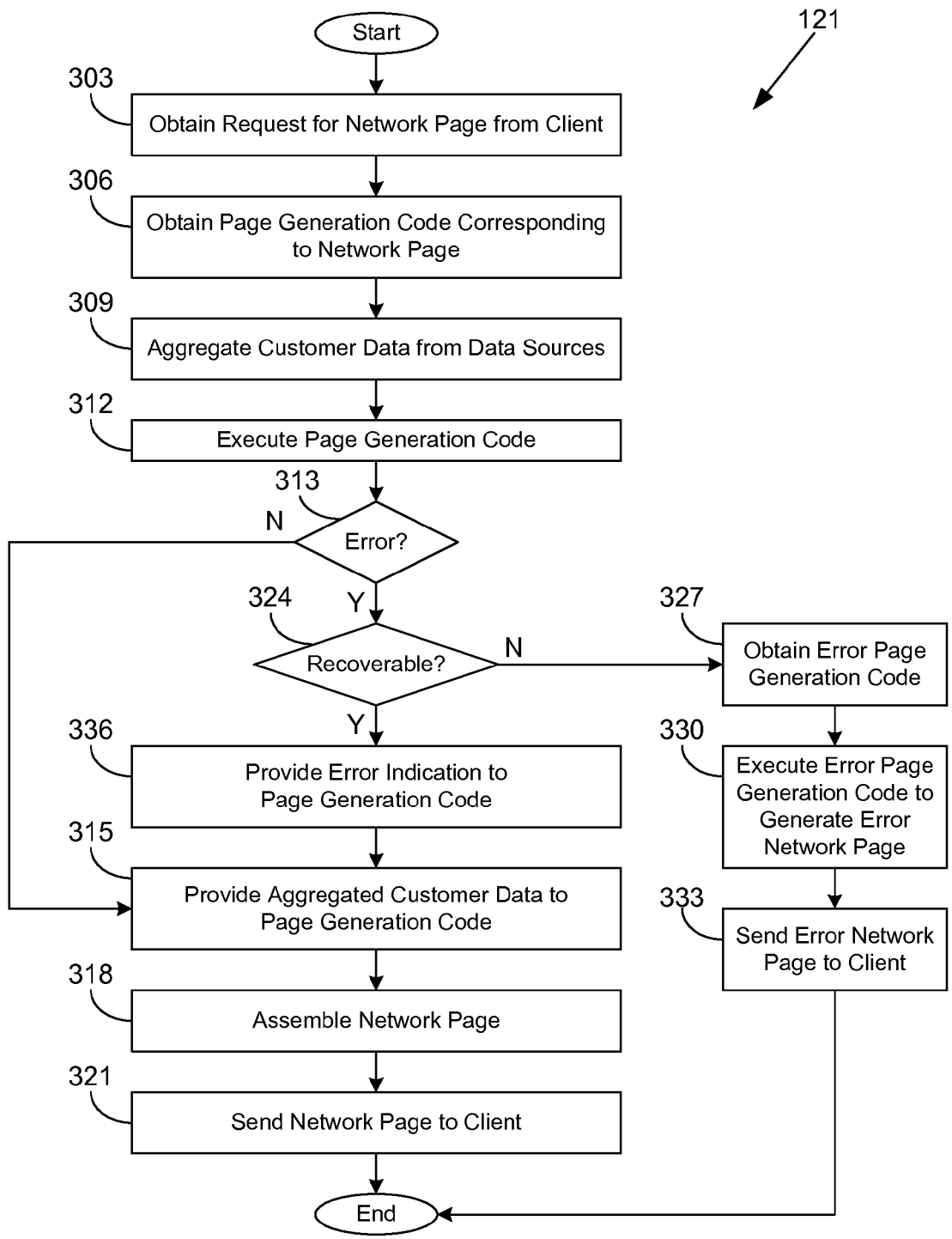
FIG. 3 is a flowchart illustrating one example of functionality implemented as portions of a network page generation application executed in a computing environment in the networked environment of FIG. 1 according to various embodiments of the present disclosure.

Referring next to FIG. 3, shown is a flowchart that provides one example of the operation of a portion of the network page generation application 121 according to various embodiments. It is understood that the flowchart of FIG. 3 provides merely an example of the many different types of functional arrangements that may be employed to implement the operation of the portion of the network page generation application 121 as described herein. As an alternative, the flowchart of FIG. 3 may be viewed as depicting an example of steps of a method implemented in the computing environment 103 (FIG. 1) according to one or more embodiments.

Beginning with box 303, the network page generation application 121 obtains a page request 133 (FIG. 1) from the client 106 (FIG. 1) by way of a network page server application 124 (FIG. 1). The page request 133 indicates a network page 130 (FIG. 1) from a network site of a customer. The network site is hosted by the hosting provider who operates the computing environment 103. In box 306, the network page generation application 121 obtains or fetches page generation code 136 (FIG. 1) corresponding to the requested network page 130. In box 309, the network page generation application 121 aggregates various data pertaining to the customer from one or more data sources 115 (FIG. 1) by way of the data aggregation service 118 (FIG. 1).

In box 312, the network page generation application 121 executes the page generation code 136. In doing so, the network page generation application 121 may perform various runtime checks to ensure that the page generation code 136 does not include any impermissible code or content. In box 313, the network page generation application 121 determines whether an error has occurred. Such an error may relate to data aggregation, data unavailability, code execution, system resources, and/or other components in the hosted network site framework. If no error has occurred, the network page generation application 121 continues from box 313 to box 315. In box 315, the network page generation application 121 provides the aggregated data to the page generation code 136 as predefined variables 139 (FIG. 1).

In box 318, the network page generation application 121 assembles the network page 130 using the output of the page generation code 136 and potentially other data. In box 321, the network page generation application 121 sends the generated network page 130 to the client 106 in response to the page request 133. Thereafter, the portion of the network page generation application 121 ends.

If, instead, the network page generation application 121 determines that an error has occurred, the network page generation application 121 proceeds from box 313 to box 324. In box 324, the network page generation application 121 determines whether the error is a recoverable error that is non-fatal to the execution of the page generation code 136. If the error is a recoverable error, the network page generation application 121 moves from box 324 to box 336. In box 336, the network page generation application 121 provides an error indication to the page generation code 136 by way of a predefined variable 139. Multiple error indications may be provided, corresponding to multiple errors that have been identified. The page generation code 136 may be configured internally to handle errors that are detected in response to the error indications. The network page generation application 121 then proceeds to box 315.

In box 315, the network page generation application 121 provides the aggregated data to the page generation code 136 as predefined variables 139. In box 318, the network page generation application 121 assembles the network page 130 using the output of the page generation code 136 and potentially other data. In box 321, the network page generation application 121 sends the generated network page 130 to the client 106 in response to the page request 133. Thereafter, the portion of the network page generation application 121 ends.

If the error is determined to be a non-recoverable error in box 324, the network page generation application 121 instead transitions to box 327. The execution of the page generation code 136 may be terminated in response to the non-recoverable error. In box 327, the network page generation application 121 obtains corresponding error page generation code 140 that is configured to handle the error from the stored error page generation code 154 (FIG. 1). Such error page generation code 140 may correspond to customer-supplied error page generation code 140 or default error page generation code 140. In box 330, the network page generation application 121 executes the error page generation code 140 to generate an error network page 141 (FIG. 1). In box 333, the network page generation application 121 sends the error network page 141 to the client 106. Thereafter, the portion of the network page generation application 121 ends.

Figure 4:
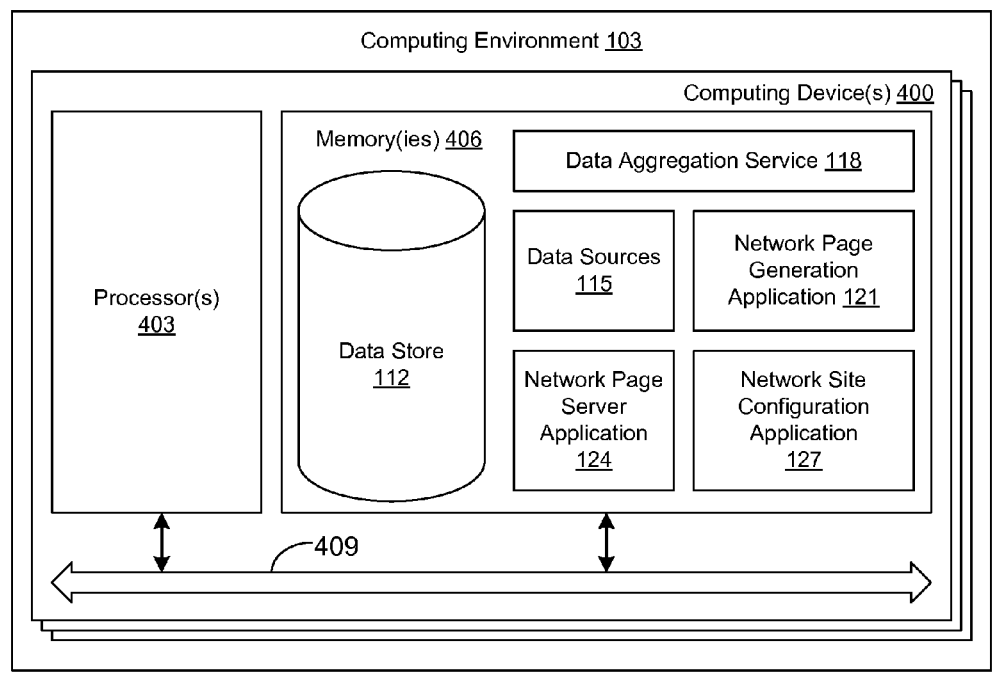
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 may include one or more computing devices 400. The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the data sources 115, the data aggregation service 118, the network page generation application 121, the network page server application 124, the network site configuration application 127, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the data sources 115, the data aggregation service 118, the network page generation application 121, the network page server application 124, the network site configuration application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the network site configuration application 127 and the network page generation application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data sources 115, the data aggregation service 118, the network page generation application 121, the network page server application 124, and the network site configuration application 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying at least one program executable in at least one computing device, the at least one program comprising:

code that, in response to receiving a request for a network page from a client, aggregates data from a plurality of data sources for use by page generation code supplied by a customer, the network page being associated with a network site hosted by a hosting provider on behalf of the customer;

code that executes the page generation code in response to the request, the page generation code being configured to generate at least a portion of the network page, the code that executes being configured to provide the data that has been aggregated to the page generation code as a plurality of predefined variables, the code that executes the page generation code being under control of the hosting provider;

code that executes error page generation code supplied by the customer to generate an error network page in response to determining that an internal server error has occurred, the error network page being customized for the network site by the customer;
code that sends the error network page to the client; and
wherein execution of the page generation code is terminated in response to the error.

2. The non-transitory computer-readable medium of claim 1, wherein the page generation code and the error page generation code correspond to JavaServer Pages (JSP) files.

3. The non-transitory computer-readable medium of claim 1, wherein the internal server error relates to an operation of at least one of the code that aggregates the data and the code that executes the page generation code.

4. A system, comprising:
at least one computing device; and
at least one application executable in the at least one computing device, the at least one application comprising:
logic that, in response to receiving a request for a network page from a client, executes page generation code supplied by a customer in response to the request, the page generation code being configured to generate at least a portion of the network page, the network page being associated with a network site hosted by a hosting provider on behalf of the customer; and
logic that sends an error network page to the client in response to determining that an error has occurred in the logic that executes the page generation code, the error network page being customized for the network site by the customer.

5. The system of claim 4, wherein execution of the page generation code is terminated in response to the error.

6. The system of claim 4, wherein the logic that executes the page generation code is under control of the hosting provider.

7. The system of claim 4, wherein the logic that executes the page generation code further comprises logic that aggregates data from a plurality of data sources for use by the page generation code.

8. The system of claim 7, wherein the page generation code is restricted from accessing the data sources directly.

9. The system of claim 7, wherein the logic that executes the page generation code further comprises logic that provides the data that has been aggregated to the page generation code as a plurality of predefined variables.

10. The system of claim 4, wherein the error corresponds to a hypertext transfer protocol (HTTP) error status code.

11. The system of claim 10, wherein the HTTP error status code indicates an internal server error.

12. The system of claim 10, wherein the HTTP error status code is provided to customer-supplied error page generation code which is configured to generate the error network page in response to determining that the error has occurred in the logic that executes the page generation code.

13. The system of claim 4, wherein the at least one application further comprises logic that executes error page generation code to generate the error network page in response to determining that the error has occurred in the logic that executes the page generation code.

14. The system of claim 13, wherein the error page generation code is supplied by the customer.

15. The system of claim 13, wherein the page generation code and the error page generation code comprise JavaServer Pages (JSP) code.

16. A method, comprising:
receiving, via at least one of one or more computing devices, a request for a network page from a client, the network page being associated with a network site hosted by a hosting provider on behalf of a customer;
aggregating, via at least one of the one or more computing devices, data from a plurality of data sources for use by page generation code supplied by the customer, the page generation code being configured to generate at least a portion of the network page;
executing, via at least one of the one or more computing devices, the page generation code in response to the request; and
providing, via at least one of the one or more computing devices, an error indication to the page generation code in response to determining that an error has occurred while performing the aggregating.

17. The method of claim 16, wherein the page generation code is restricted from including exception-handling code.

18. The method of claim 16, further comprising:
generating, via at least one of the one or more computing devices, the network page including the at least a portion of the network page generated by the page generation code; and
sending, via at least one of the one or more computing devices, the network page to the client.

19. The method of claim 16, wherein the error relates to unavailability of at least some of the data.

20. The method of claim 16, wherein the page generation code is restricted from accessing the data sources directly.

21. The method of claim 16, further comprising providing, via at least one of the one or more computing devices, the error indication to the page generation code as a predefined variable.

22. The method of claim 16, further comprising providing, via at least one of the one or more computing devices, the data that has been aggregated to the page generation code as a plurality of predefined variables.

23. The method of claim 16, further comprising sending, via at least one of the one or more computing devices, an error network page to the client in response to determining that the error has occurred, the error network page being customized for the network site by the customer.

24. The method of claim 23, further comprising executing, via at least one of the one or more computing devices, error page generation code supplied by the customer to generate the error network page in response to determining that the error has occurred.

* * * * *